US012633139B2

(12) United States Patent
Noble et al.

(10) Patent No.: US 12,633,139 B2
(45) Date of Patent: May 19, 2026

(54) ENHANCED VIDEO-BASED DRIVER MONITORING USING PHASE DETECT SENSORS

(71) Applicant: Seeing Machines Limited, Fyshwick (AU)

(72) Inventors: John Noble, Fyshwick (AU); Timothy James Henry Edwards, Kallista (AU)

(73) Assignee: Seeing Machines Limited, Fyshwick (AU)

( * ) Notice: Subject to any disclaimer, the term of this patent is extended or adjusted under 35 U.S.C. 154(b) by 542 days.

(21) Appl. No.: 16/640,909

(22) PCT Filed: Aug. 20, 2018

(86) PCT No.: PCT/AU2018/050881
§ 371 (c)(1),
(2) Date: Feb. 21, 2020

(87) PCT Pub. No.: WO2019/036751
PCT Pub. Date: Feb. 28, 2019

(65) Prior Publication Data
US 2020/0210733 A1    Jul. 2, 2020

(30) Foreign Application Priority Data

Aug. 22, 2017    (AU) ................................ 2017903374

(51) Int. Cl.
*G06V 20/59*        (2022.01)
*B60W 40/08*        (2012.01)
*G06V 40/16*        (2022.01)

(52) U.S. Cl.
CPC ........... *G06V 20/597* (2022.01); *B60W 40/08* (2013.01); *G06V 40/172* (2022.01)

(58) Field of Classification Search
None
See application file for complete search history.

(56) References Cited

U.S. PATENT DOCUMENTS 7,043,056 B2    5/2006   Edwards et al.
2009/0261979 A1*  10/2009   Breed ................. G01F 23/0076
                                                          340/576

(Continued)

FOREIGN PATENT DOCUMENTS

WO        2011048749 A1    4/2011
WO        2016131075 A1    8/2016

*Primary Examiner* — Christian Chace
*Assistant Examiner* — Katherine Marie Fitzharris
(74) *Attorney, Agent, or Firm* — FisherBroyles, LLP; Jason P. Mueller

(57)                ABSTRACT

A disclosed method determines a distance from a camera to a face of a vehicle driver using information determined by phase detecting pixels of a digital image sensor of the camera. The method includes capturing an image of the driver including the driver's face and processing the image to determine a face region of the image. The method further includes determining a subset of phase detecting pixels of the digital image sensor that are associated with the face region of the image. A comparison of first and second image data generated by the determined phase detecting pixels is then used to determine a spatial image offset. The spatial image offset is then used to generate a first distance estimate of a distance between a region of the driver's face and the digital image sensor. The first distance estimate is used to track the driver's head or eyes.

9 Claims, 15 Drawing Sheets

(56)　　　　　References Cited

U.S. PATENT DOCUMENTS

| | | | |
|---|---|---|---|
| 2010/0110275 A1 | 5/2010 | Mathieu | |
| 2015/0286340 A1 | 10/2015 | Send et al. | |
| 2015/0319420 A1 | 11/2015 | Fettig et al. | |
| 2016/0337576 A1* | 11/2016 | Nobayashi | G06T 7/70 |
| 2017/0094153 A1 | 3/2017 | Wang et al. | |

* cited by examiner

700

1100

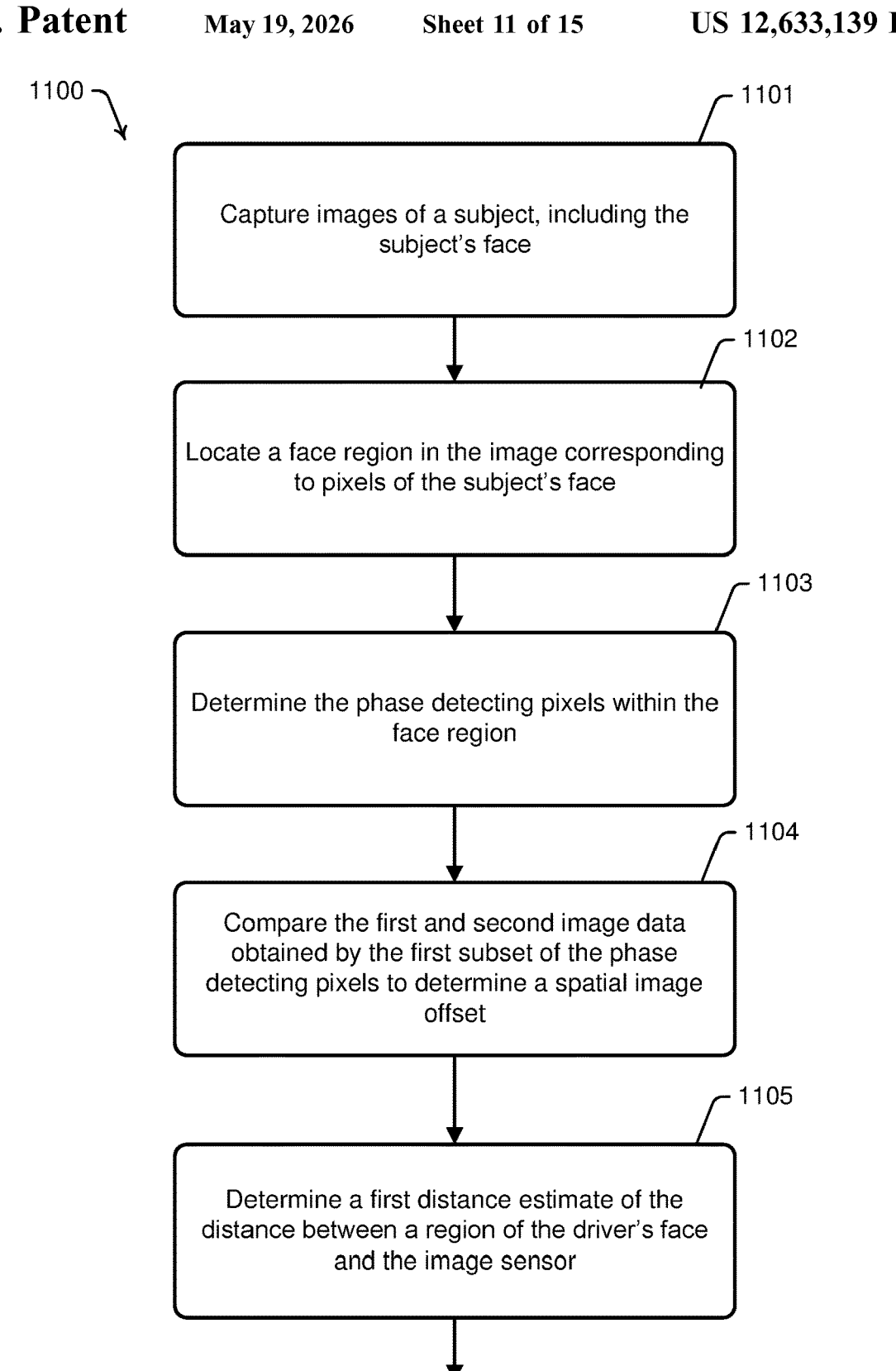

1101

Capture images of a subject, including the subject's face

1102

Locate a face region in the image corresponding to pixels of the subject's face

1103

Determine the phase detecting pixels within the face region

1104

Compare the first and second image data obtained by the first subset of the phase detecting pixels to determine a spatial image offset

1105

Determine a first distance estimate of the distance between a region of the driver's face and the image sensor Input the first distance estimate to a face range/scale calibration for a driver monitoring algorithm to track the driver's head or eyes

Figure 11

1200
1200
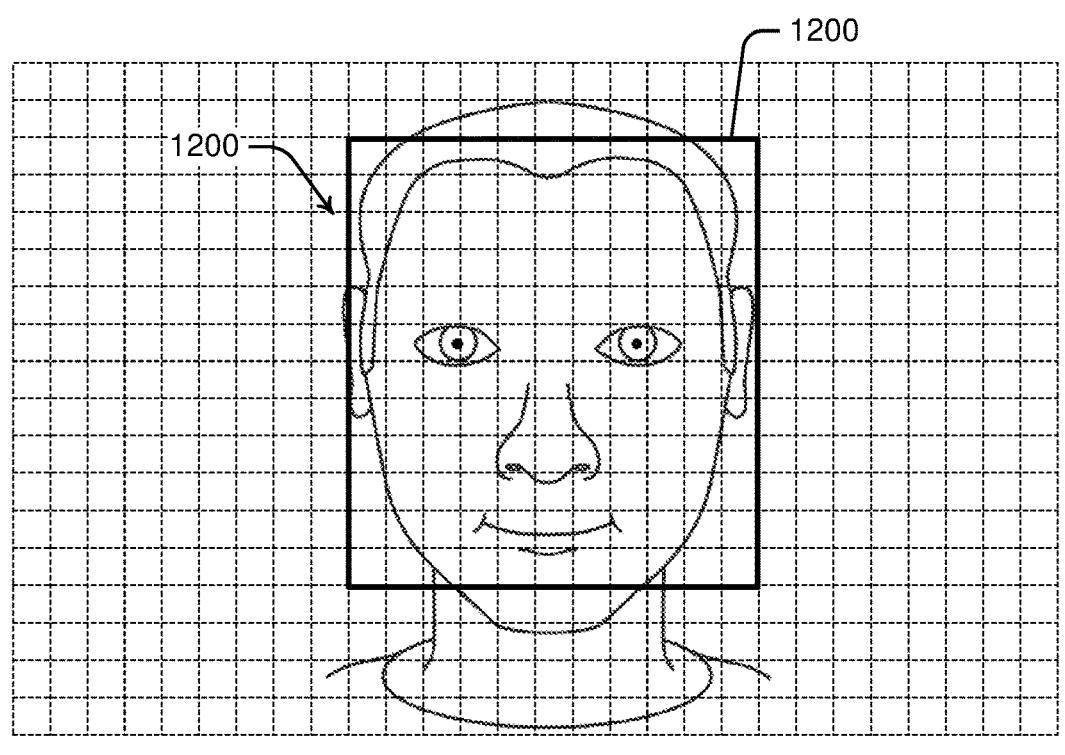
1200
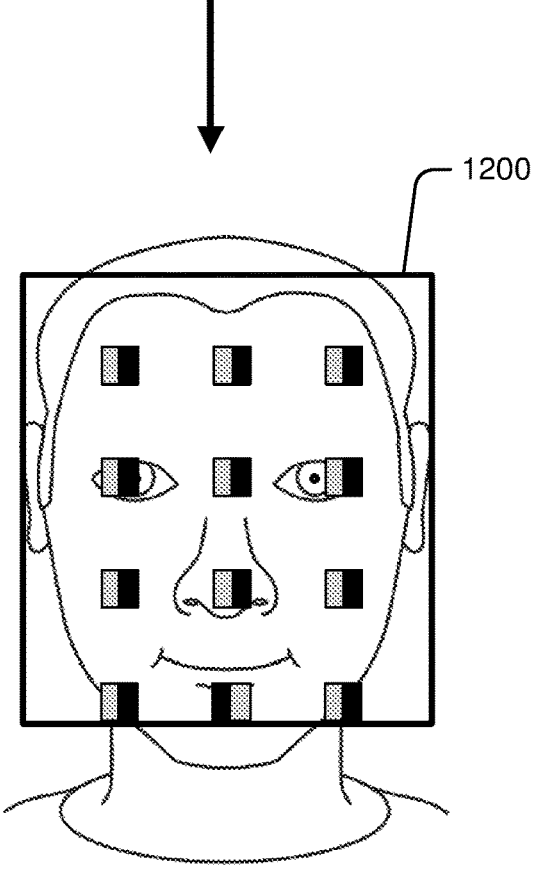
Figure 12

First image data

Spatial image offset

Second image data

ENHANCED VIDEO-BASED DRIVER MONITORING USING PHASE DETECT SENSORS

This application is a national stage entry under 35 U.S.C. 371 of PCT Patent Application No. PCT/AU2018/050881, filed Aug. 20, 2018, which claims priority to Australia Patent Application No. 2017903374, filed Aug. 22, 2017, the entire contents of each of which are incorporated herein by reference.

FIELD

This disclosure relates to camera imaging systems and to a method and system for estimating the depth to objects imaged in a camera monitoring system. Embodiments of the disclosure have been developed for driver monitoring systems in vehicles. While some embodiments will be described herein with reference to that application, it will be appreciated that the disclosure is not limited to such a field of use, and is applicable in broader contexts.

BACKGROUND

Any discussion of the background art throughout the specification should in no way be considered as an admission that such art is widely known or forms part of common general knowledge in the field.

Vehicle driver monitoring systems involve capturing video images of a vehicle driver and estimating the driver's attention and alertness from parameters such as their head pose, eye gaze direction and eye closure. To contain costs, conventional systems utilize typical two dimensional digital cameras and advanced image processing to extract the required head pose, eye gaze and eye closure information. As the three dimensional position of the driver's head is not known in these two dimensional systems, head pose and eye gaze vectors are estimated by assuming a fixed size of the driver's head using a statistical model and applying a size-distance relationship. This estimation allows extrapolating of the distance or depth dimension from the camera to the subject. However, anthropomorphic data from human measurement studies shows that face dimensions vary by about 6.4%, which creates a corresponding 6.4% range error in the head scale size. This translates to a corresponding error in the distance or depth of the driver's head in captured images which, in turn, limits the accuracy of estimated head pose and eye gaze.

Similar uncertainties exist in relying on fixed estimates of driver eye sizes. Eyes have a smaller variation in sizes than for faces (iris diameters vary by approximately 6.8% in adult humans). However if the driver is wearing glasses the unknown magnification effect of the glasses lens can make the eye size uncertainty grow to over 10%.

The consequent error in measurement of the range of the face or eyes from the camera ultimately limits the utility of the driver monitoring system for automotive applications.

The above scale-range uncertainty can be reduced by incorporating shadow effects from a known camera-light geometry to triangulate points on a driver's face. However, this technique is very sensitive to changes in the vehicle geometry and scene lighting causing false shadows.

More advanced vehicle driver monitoring systems utilize stereo camera systems or three dimensional cameras to image the driver in three dimensions. However, these systems are inherently more expensive and may require a complex calibration procedure during installation. Other more advanced sensory devices such as time-of-flight (ToF) cameras or LIDAR are presently either more expensive and/or cannot resolve an image of the pupil and cornea of the eye with sufficient resolution and contrast to resolve the driver's gaze direction.

SUMMARY

In accordance with a first embodiment of the disclosure, there is provided a method of measuring a distance from a camera to a face of a vehicle driver in a driver monitoring system, the camera including a digital image sensor having a plurality of phase detecting pixels, the phase detecting pixels configured to generate first and second image data corresponding to light received along two optical paths through the camera's imaging system, the method including:

a) positioning the camera at an imaging position to capture an image of the driver including the driver's face;

b) processing the image to identify a face region being a region of pixels corresponding to the driver's face or head;

c) determining a first subset of the phase detecting pixels representing those which correspond with the face region;

d) comparing the first and second image data obtained by the first subset of the phase detecting pixels to determine a spatial image offset; and e) determining, from the spatial image offset, a first distance estimate of the distance between a region of the driver's face and the image sensor.

In some embodiments the first distance includes an estimate of the distance between one or more facial features of the driver's face and the image sensor.

In some embodiments the method includes the stage of:

f) inputting the first distance estimate to a driver monitoring algorithm for tracking the driver's head or eyes.

In one embodiment stage f) includes inputting the first distance estimate and two dimensional facial feature locations within the image to a three dimensional head model to locate the driver's head in three dimensions.

In some embodiments stage b) includes performing contrast detection to detect an outline of the driver's face. In some embodiments stage b) includes performing facial recognition of the driver. In some embodiments stage b) includes performing a face localization procedure by searching the image for one or more predefined face templates.

In some embodiments the method includes the stage of determining a second distance estimate of the distance between the driver's face and the image sensor by determining a size of the face in the image and inputting this to a size/distance model.

In some embodiments the method includes the stage of comparing the first distance estimate with the second distance estimate to obtain a distance error measurement.

In accordance with a second embodiment of the disclosure, there is provided a method of remotely monitoring a head pose or eye gaze of a driver of a vehicle using a camera, the method including the stages of:

a) positioning the camera to capture a plurality of time separated images of the driver's face;

b) determining the two dimensional position of the driver's eyes in the images;

c) determining a distance to the driver's face using a method according to the first embodiment;

d) determining, based on stages b) and c), the three dimensional position of the driver's face or eyes; and e) determining a head orientation or eye gaze of the driver.

In accordance with a third embodiment of the disclosure, there is provided a method of measuring a distance from a camera to an object, the camera including a digital image sensor having a plurality of phase detecting pixels, the phase detecting pixels configured to generate first and second image data corresponding to light received along two optical paths through the camera's imaging system, the method including:

a) positioning the camera at an imaging position to capture an image of the object;

b) processing the image to identify an object region being a region of pixels corresponding to the object within the image;

c) determining a first subset of the phase detecting pixels representing those which correspond with the object region;

d) comparing the first and second image data obtained by the first subset of the phase detecting pixels to determine a spatial image offset;

e) determining, from the spatial image offset, a first distance estimate of the distance between the object and the image sensor.

In accordance with a fourth embodiment of the disclosure, there is provided a system to measure a distance to a face of a vehicle driver in a driver monitoring system, the system including:

a camera positioned to capture an image of the driver including the driver's face, the camera including a digital image sensor having a plurality of phase detecting pixels, the phase detecting pixels configured to generate first and second image data corresponding to light received along two optical paths through the camera's imaging system; and a processor configured to:

process the image to identify a face region being a region of pixels corresponding to the driver's face or head;

determine a first subset of the phase detecting pixels representing those which correspond with the face region;

compare the first and second image data obtained by the first subset of the phase detecting pixels to determine a spatial image offset; and determine, from the spatial image offset, a first distance estimate of the distance between a region of the driver's face and the image sensor.

In accordance with a fifth embodiment of the disclosure, there is provided a system to measure a distance to an object, the system including:

a camera positioned to capture an image of the object, the camera including a digital image sensor having a plurality of phase detecting pixels, the phase detecting pixels configured to generate first and second image data corresponding to light received along two optical paths through the camera's imaging system; and a processor configured to:

process the image to identify an object region being a region of pixels corresponding to the object within the image;

determine a first subset of the phase detecting pixels representing those which correspond with the object region;

compare the first and second image data obtained by the first subset of the phase detecting pixels to determine a spatial image offset; and determine, from the spatial image offset, a first distance estimate of the distance between the object and the image sensor.

BRIEF DESCRIPTION OF THE DRAWINGS

Preferred embodiments of the disclosure will now be described, by way of example only, with reference to the accompanying drawings in which:

FIG. 11 is a process flow diagram illustrating the primary stages in a method of measuring a distance from a camera to a face of a vehicle driver;

FIG. 12 is an image of a driver's face overlaid with pixels of an image sensor used to capture that image and also phase detecting pixels within the face region;

DETAILED DESCRIPTION

Driver Monitoring System Overview

Figure 1:
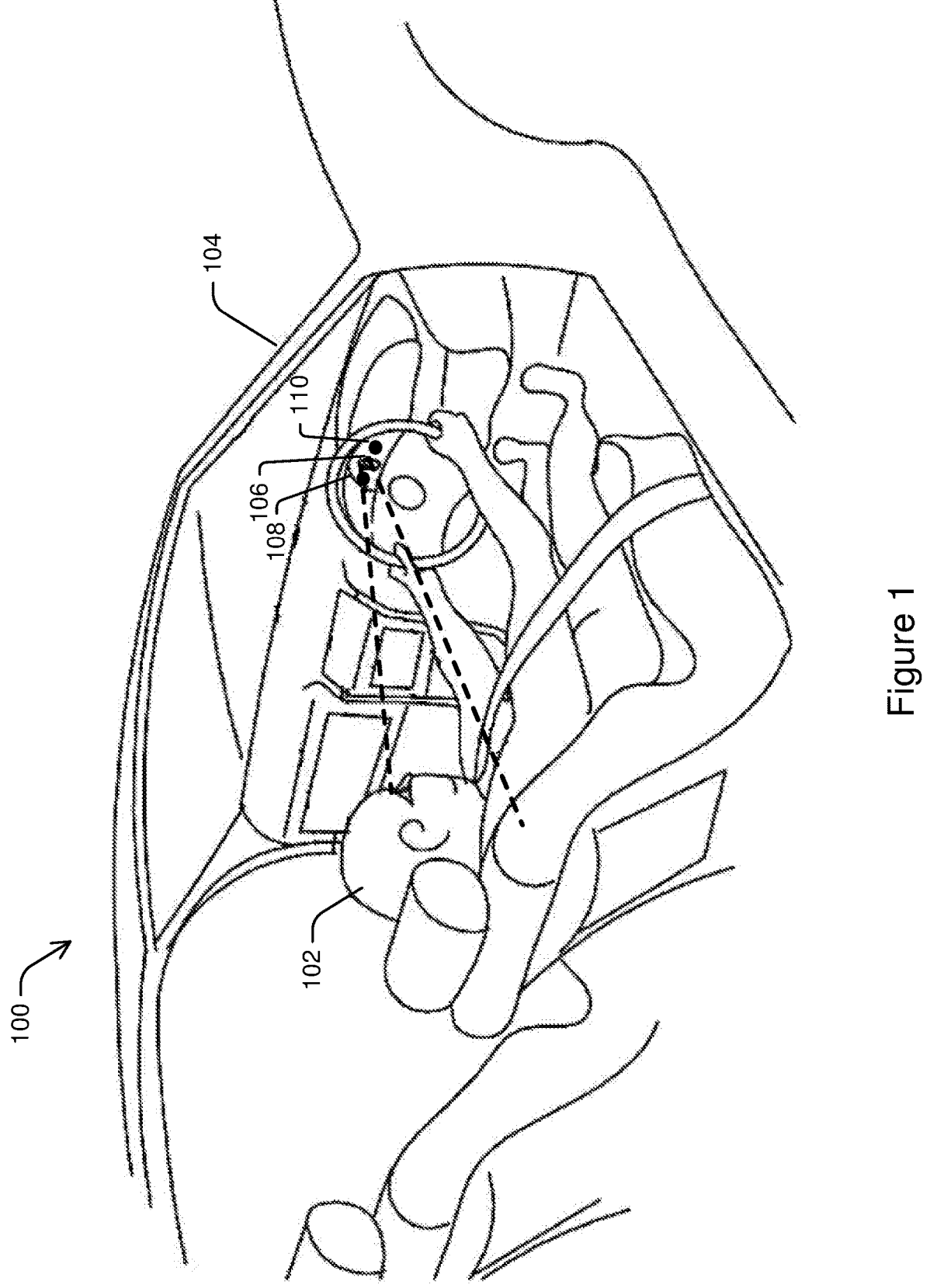
FIG. 1 is a perspective view of an interior of a vehicle illustrating a driver monitoring system.
Figure 2:
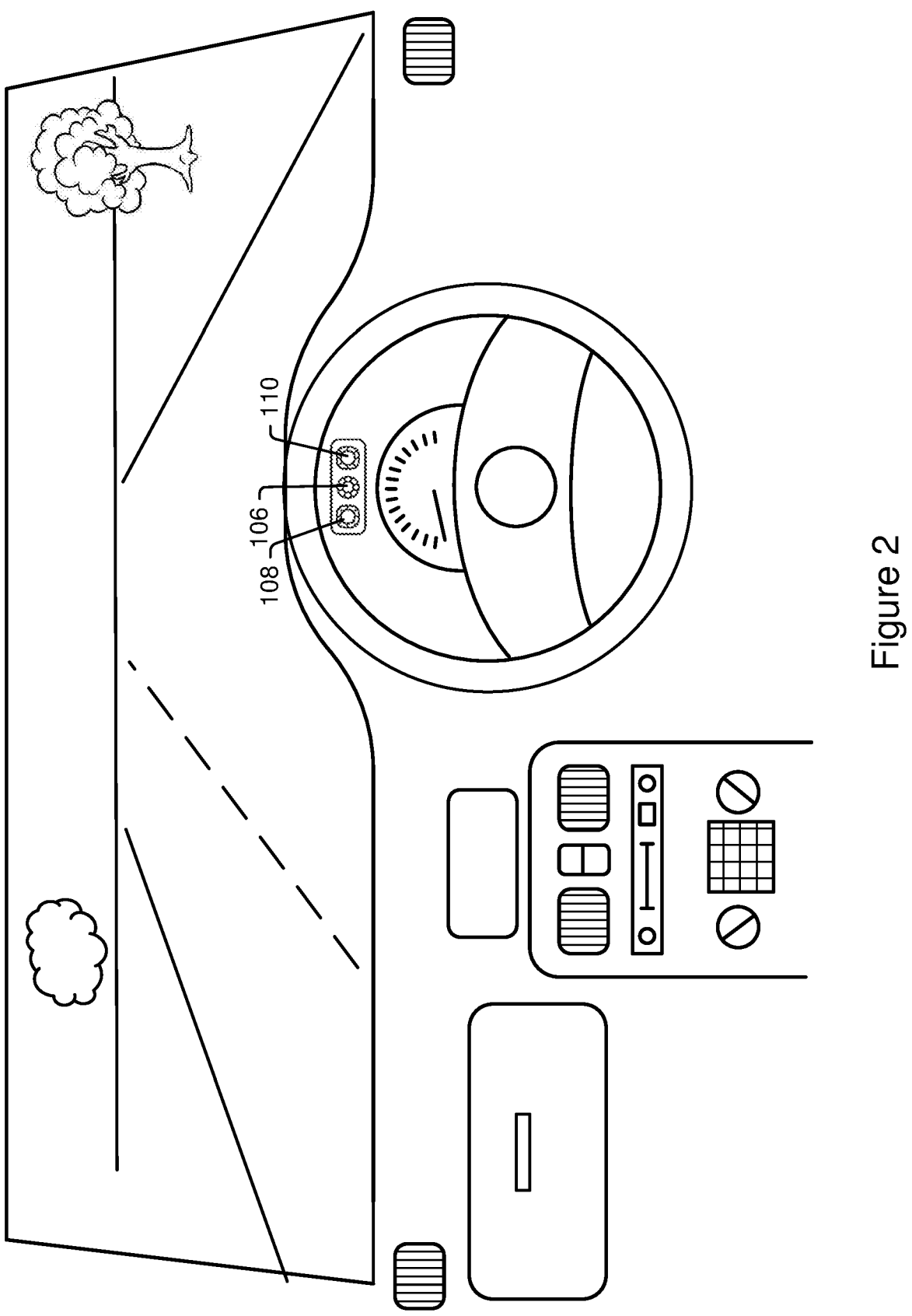
FIG. 2 is a perspective driver's view of the vehicle of FIG. 1 illustrating the driver monitoring system of FIG. 1 and forward field of view of the driver.
Figure 3:
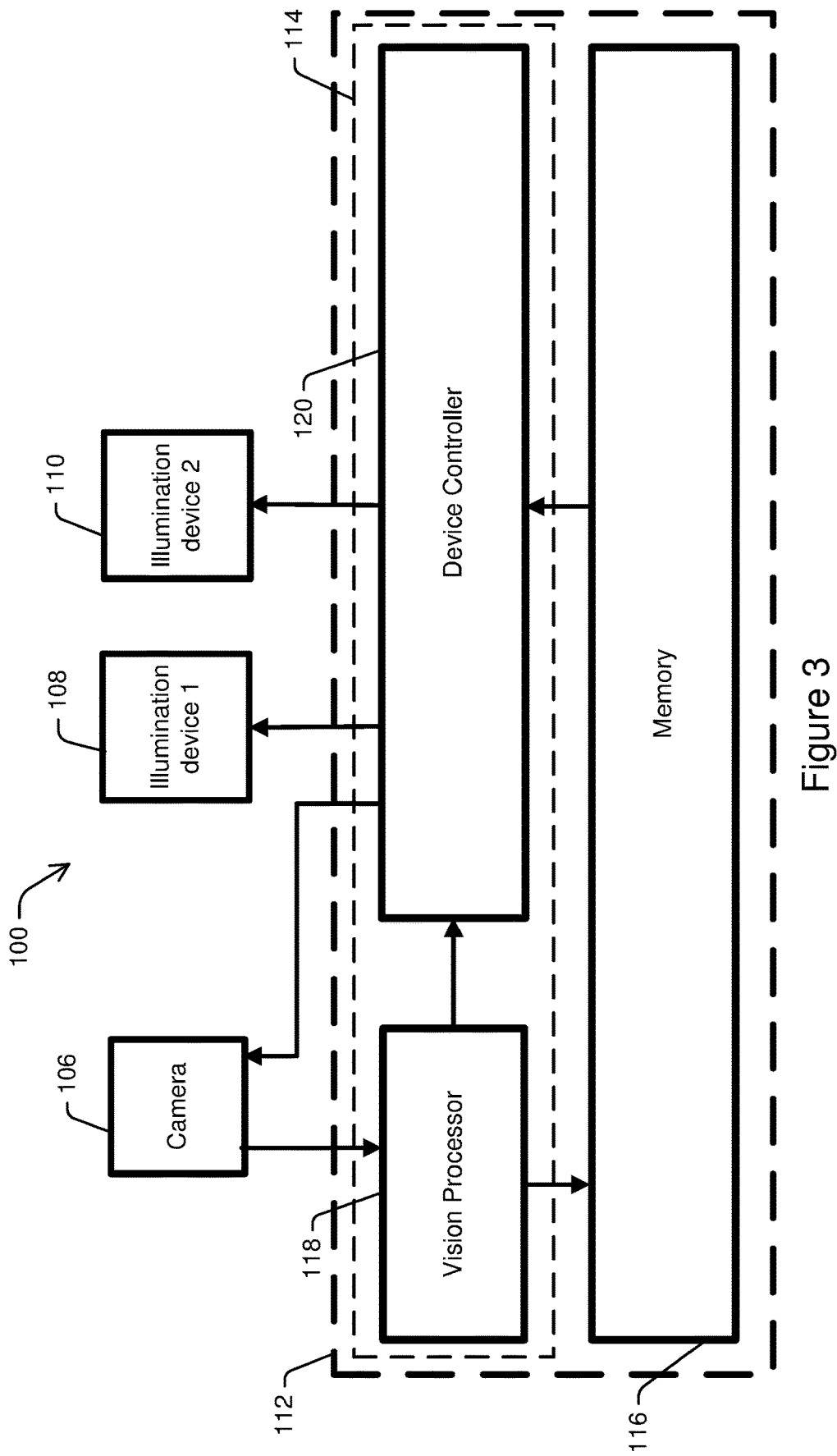
FIG. 3 is a schematic functional diagram of a driver monitoring system.

Referring initially to FIGS. 1 to 3, there is illustrated and driver monitoring system 100 for monitoring a state of a driver 102 in a vehicle 104. Although the disclosure is described herein with reference to monitoring a driver of a vehicle, it will be appreciated that the system is equally applicable to monitoring subjects in broader monitoring environments such as in vehicle or aircraft training facilities and in air traffic control facilities.

System 100 includes an infrared camera 106 positioned to capture images of the eyes of driver 102 at wavelengths in the infrared range. Two horizontally spaced apart infrared illumination devices 108 and 110 are disposed symmetrically about camera 106 to selectively illuminate the driver's face with infrared radiation during image capture by camera 106. Illumination devices 108 and 110, for example, infrared LEDs or other types of light sources such as directional filament lights or fluorescent lights. Operation in the infrared range reduces distraction to the driver. Use of two spaced apart illumination devices 108 and 110 provides for illumination at different angles which allows for reduction of glare effects as described in PCT Patent Application Publication WO 2016/131075 entitled "Glare Reduction" and assigned to Seeing Machines Limited. It will be appreciated that, in alternative embodiments, system 100 is able to operate using only a single infrared illumination device at the expense of potential performance degradation in the presence of glare.

Camera 106 is a two dimensional camera having an image sensor that is configured to sense electromagnetic radiation in the infrared range. In other embodiments, camera 106 may be replaced by a single two dimensional camera having depth sensing capability or a pair of like cameras operating in a stereo configuration and calibrated to extract depth. Although camera 106 is configured to image in the infrared wavelength range, it will be appreciated that, in alternative embodiments, camera 106 may image in the visible range. As will be described below, camera 106 includes an image sensor employing a plurality of phase detecting pixels.

As shown in FIG. 3 a system controller 112 acts as the central processor for system 100 and is configured to perform a number of functions as described below. Controller 112 is located within the dash of vehicle 5 and may be connected to or integral with the vehicle on-board computer. In another embodiment, controller 112 may be located within a housing together with camera 106 and illumination devices 108 and 110. The housing is able to be sold as an after-market product, mounted to a vehicle dash and subsequently calibrated for use in that vehicle. In further embodiments, such as flight simulators, controller 112 may be an external computer such as a personal computer.

Controller 112 may be implemented as any form of computer processing device or portion of a device that processes electronic data, e.g., from registers and/or memory to transform that electronic data into other electronic data that, e.g., may be stored in registers and/or memory. As illustrated in FIG. 2, controller 112 includes a microprocessor 114, executing code stored in memory 116, such as random access memory (RAM), read-only memory (ROM), electrically erasable programmable read-only memory (EEPROM), and other equivalent memory or storage systems as should be readily apparent to those skilled in the art.

Microprocessor 114 of controller 112 includes a vision processor 118 and a device controller 120. Vision processor 118 and device controller 120 represent functional elements which are performed by microprocessor 114. However, it will be appreciated that, in alternative embodiments, vision processor 118 and device controller 120 may be realized as separate hardware such as microprocessors in conjunction with custom or specialized circuitry or Field Programmable Gate Arrays.

Vision processor 118 is configured to process the captured images to determine a three dimensional gaze position of the driver 5 within the monitoring environment. To achieve this, vision processor 118 utilizes one or more gaze determination algorithms. This may include, by way of example, the methodology described in U.S. Pat. No. 7,043,056 entitled "Facial Image Processing System" and assigned to Seeing Machines Pty Ltd. Vision processor 118 may also perform various other functions including determining attributes of the driver 5 such as eye closure and tracking the driver's head motion. The raw image data, gaze position data and other data obtained by vision processor 118 is stored in memory 116.

Device controller 120 is configured to control camera 106 and to selectively actuate illumination devices 108 and 110 in sync with the exposure time of camera 106. Illumination devices 108 and 110 are electrically connected to device controller 120 but may also be controlled wirelessly by controller 120 through wireless communication such as Bluetooth™ or WiFi™ communication.

During operation of vehicle 104, device controller 120 activates camera 106 to capture images of the face of driver 102 in a video sequence. Illumination devices 108 and 110 are alternatively activated and deactivated in synchronization with alternate frames of the images captured by camera 106 to illuminate the driver during image capture. Working in conjunction, device controller 120 and vision processor 118 provide for capturing and processing images of the driver to obtain driver state information such as drowsiness, attention and gaze position during an ordinary operation of vehicle 104.

To accurately monitor a driver's awareness, it is useful to determine the driver's head pose and gaze direction in three dimensions. To achieve this, the position of the driver's head and eyes must be known relatively accurately in three dimensions with respect to the camera image sensor. Determining a distance from the camera to the driver's head and eyes is often difficult to achieve at low cost.

Operation of Phase Detect Pixels and Image Sensors

This disclosure relates to a method of measuring a distance from camera 106 to a face of driver 102 in a driver monitoring system such as system 100. The method utilizes a camera including a digital image sensor having a plurality of phase detecting (PD) pixels. As described below, PD pixels are able to distinguish light incident from different angles to determine spatial phase characteristics of the imaging system. For example, PD pixels are configured to generate first and second image data corresponding to light received along two optical paths through the camera's imaging system.

Various types of phase detecting image sensors are available on the market. Examples include Dual Pixel CMOS sensors developed by Canon Inc., the IMX260 image sensor developed by Sony Corporation and the AR1337 CMOS digital image sensor manufactured by ON Semiconductor. All of these sensors include PD pixels and were configured to provide on-chip phase detect autofocus processing. However, the inventors have identified other advantages of this technology as described herein.

In general, PD pixels are pixels having capability to distinguish the angle of incident light. In some embodiments, the PD pixels work in pairs and include a physical mask structure applied so as to restrict the angles of incoming light incident thereon. This has the effect of only imaging light that has passed through a sub-region of the primary imaging lens. Another PD pixel in a pixel pair has a complementary physical mask structure configured to pass the light in that subregion restricted by the other pixel in the pair but restrict the light allowed to pass by the other pixel in the pair.

Figure 4:
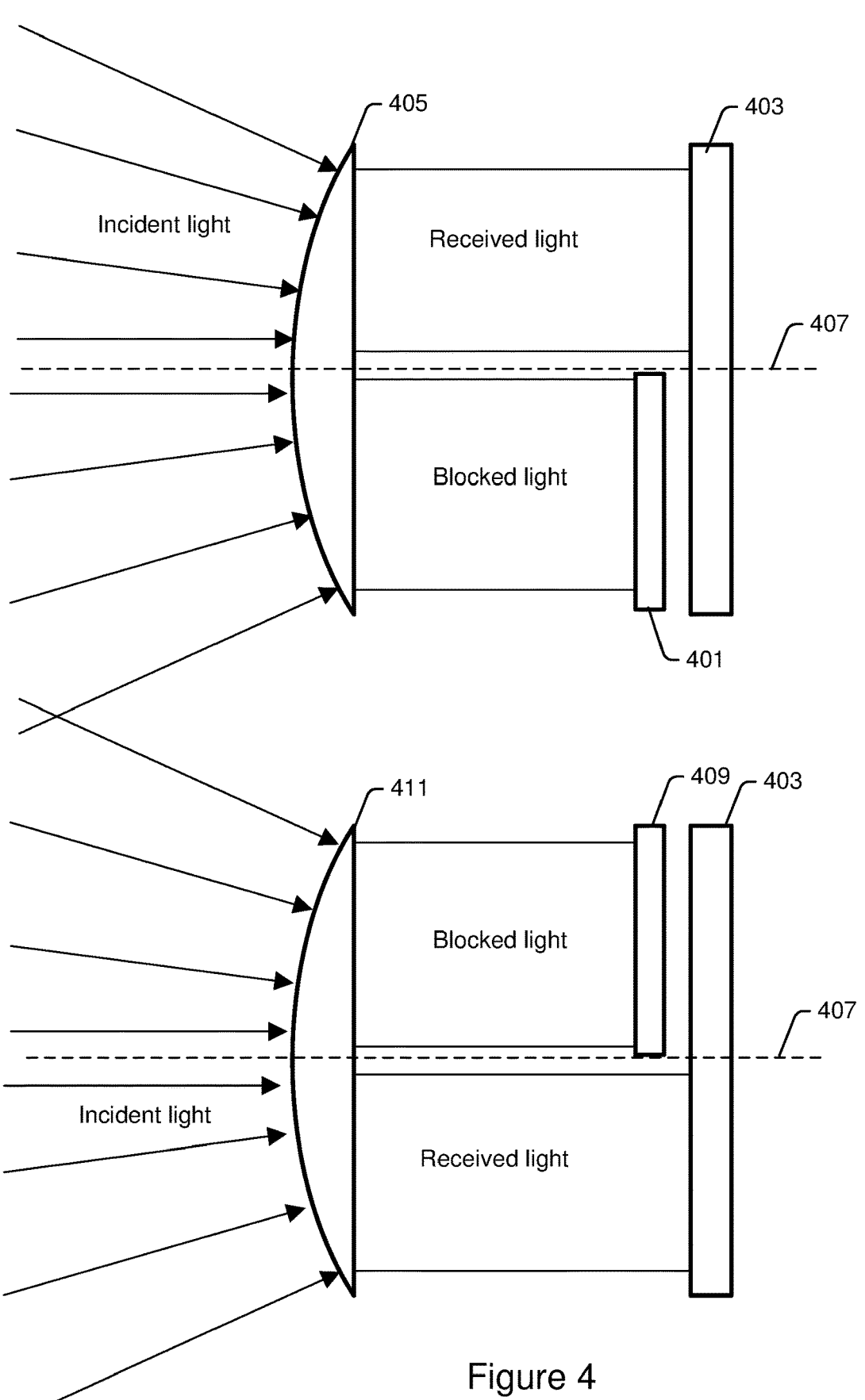
FIG. 4 is a side view of a complementary phase detecting pixel pair including physical masks.

This complementary PD pixel pair is illustrated in FIG. 4. The top panel illustrates a first PD pixel including a first physical mask 401 disposed across a bottom half of the pixel between the sensor 403 and an associated micro-lens 405 to block light rays incident from angles on a lower side of the optical axis 407. The lower panel illustrates the opposite scenario wherein a second mask 409 is disposed across an upper half of the pixel between the sensor 403 and an associated microlens 411 to block light rays incident from angles on an upper side of the optical axis 407.

Figure 5:
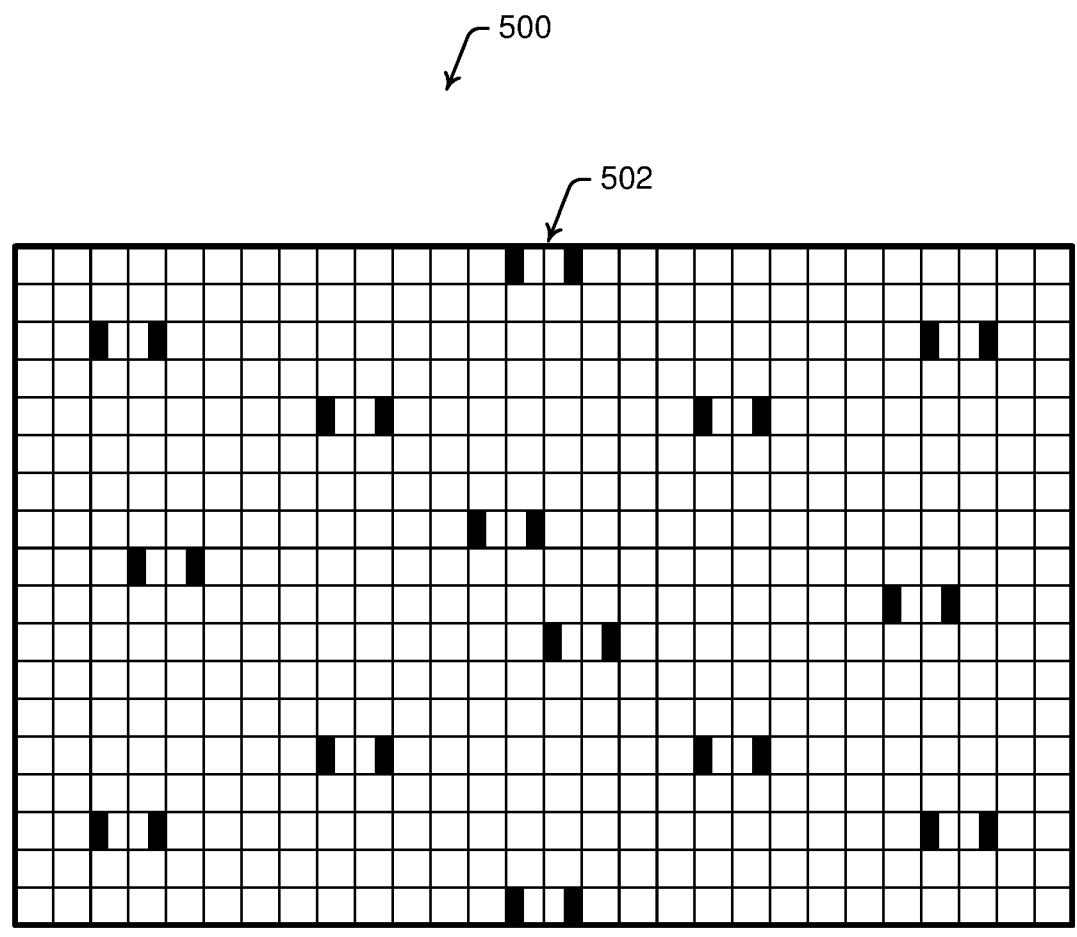
FIG. 5 is a plan view of an image sensor including phase detecting pixel pairs.

The pairs of PD pixels should be located close to each other so that both pixels in the pair are imaging the same region of the scene. FIG. 5 illustrates an example image sensor 500, including a plurality of PD pixel pairs (e.g. 502) disposed at spatially separated locations across the sensor. In FIG. 5, the number of pixels has been significantly reduced for clarity. Modern high definition image sensors have millions of pixels located within an image sensor of dimensions about 1 mm by 1 mm. In the embodiment illustrated in FIG. 5, the pixels are paired into horizontally adjacent pixel locations. However, it will be appreciated that the pixels may also be paired vertically or diagonally and not necessarily in directly adjacent pixel locations.

Figure 6:
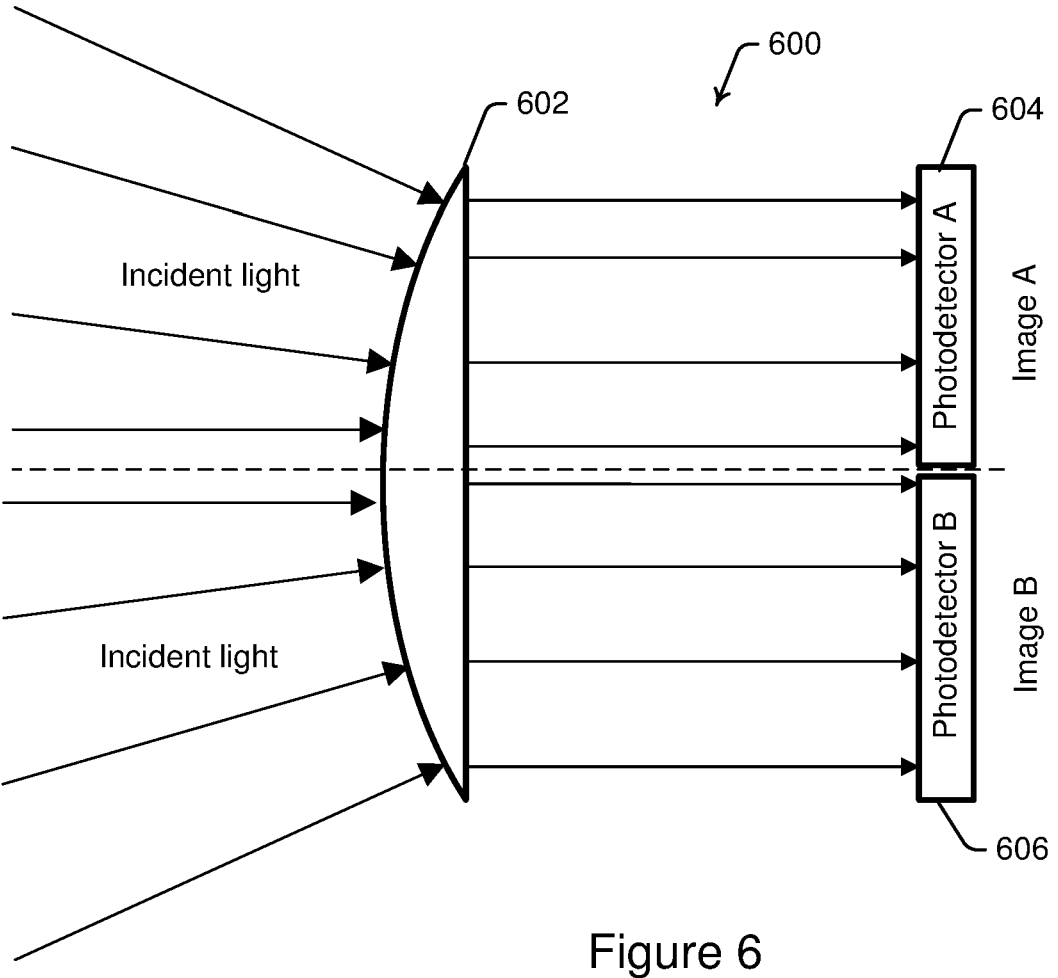
FIG. 6 is a side view of a dual pixel type phase detecting pixel.

In image sensors employing "dual pixel" type PD pixels, each PD pixel includes two independent photodetectors positioned to receive light incident from opposing sides of the primary optical axis. Thus a single pixel can perform the function of the pixel pair described above. This avoids the need for physical mask structures but requires a denser array of smaller photodetectors. An example dual pixel type PD 600 is illustrated in FIG. 6. The pixel 600 includes a micro-lens 602 and two photodetectors 604 and 606. A corresponding exemplary dual pixel image sensor 700 including dual pixel PD pixels is illustrated in FIG. 7.

Figure 8:
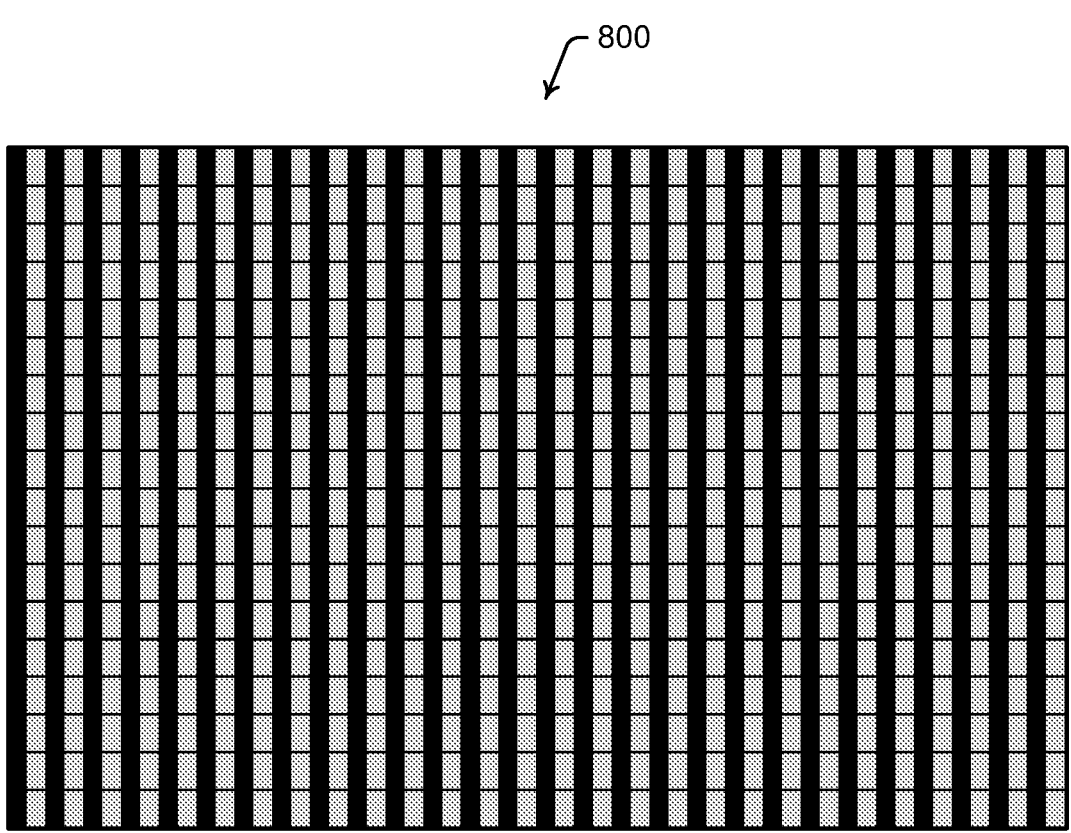
FIG. 8 is a plan view of an image sensor in which every pixel includes a dual pixel phase detecting pixel.

It will be appreciated that the PD pixels can operate as normal imaging pixels and so the density of PD pixels can vary from a few PD pixels (<5% of pixels) across the image sensor to 100% of the pixels of the array. FIG. 8 illustrates an example image sensor 800 wherein each pixel in the sensor array is a dual pixel PD pixel. By way of example, in the Dual Pixel CMOS AF image sensor developed by Canon®, each pixel includes two photodiodes paired with a single micro-lens such that each pixel in the sensor array is capable of not only providing phase detection for auto-focus but also for the camera imaging.

Figure 9:
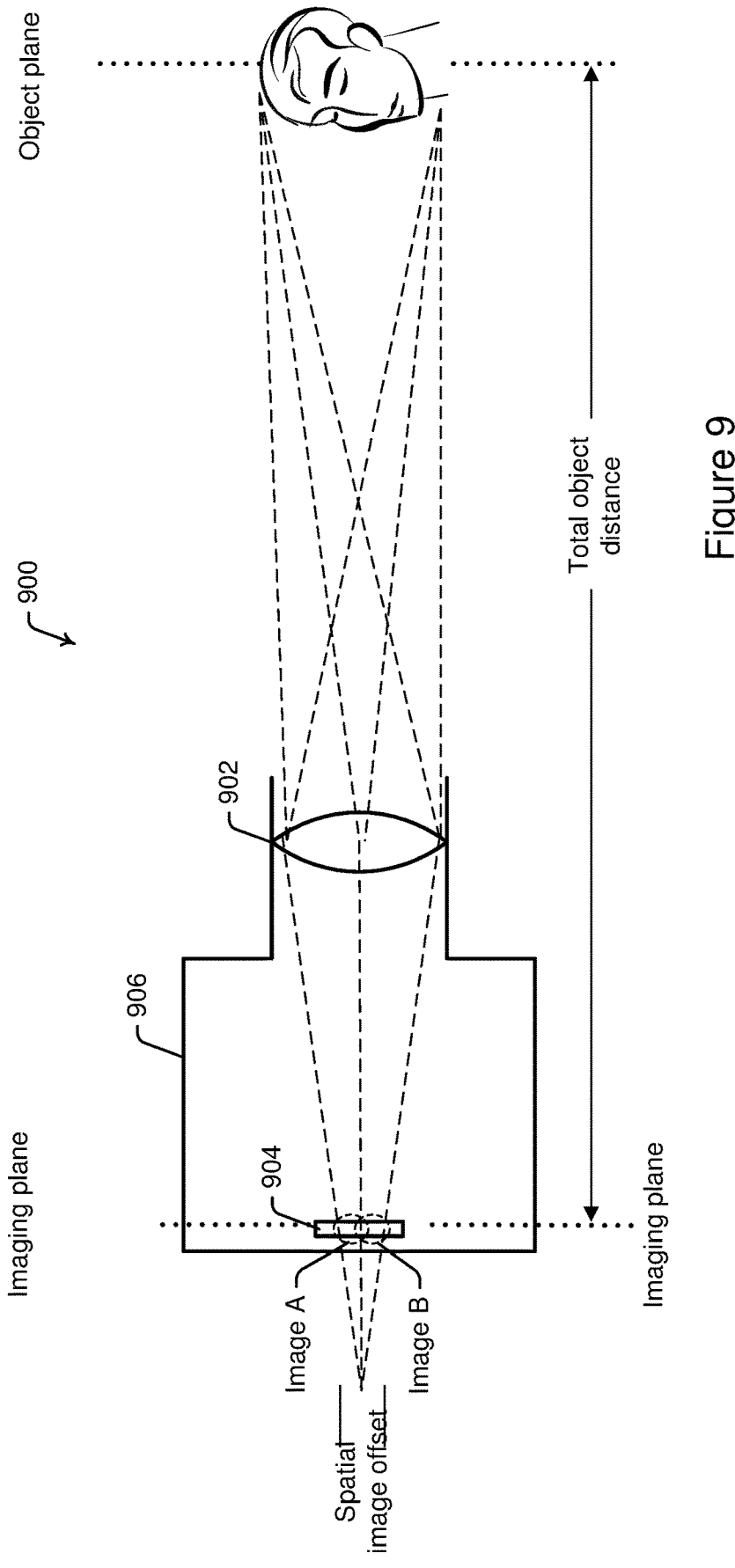
FIG. 9 is a schematic side view of a camera imaging system.

In a camera, the different optical paths of light are defined by the geometry of the imaging system and the primary imaging lens. A simple schematic illustration of a simple camera imaging system 900 is illustrated in FIG. 9. This schematic illustration shows only the primary imaging lens 902 and image sensor 904 of a camera 906 and ignores other optical elements such as mirrors and secondary lenses found in real camera systems. As illustrated in FIG. 9, some optical rays are transmitted through an upper region of lens 902 and other optical rays pass through a lower region of lens 902. These rays are distinguished by their angle of incidence onto image sensor 904. Thus, using an image sensor having PD pixels as illustrated in FIGS. 4 to 8, the PD pixels capture light traversing either through an upper or lower region of lens 902.

Figure 7:
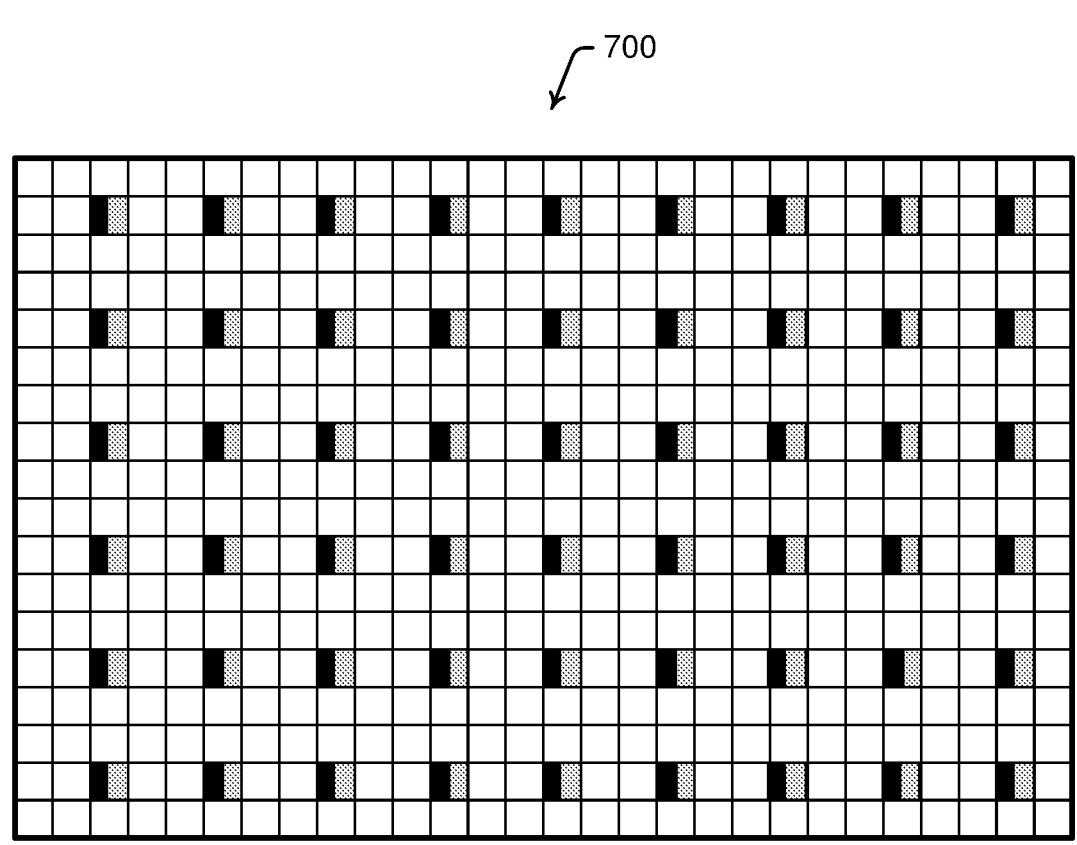
FIG. 7 is a plan view of an image sensor including dual pixel phase detecting pixels.
Figure 10:
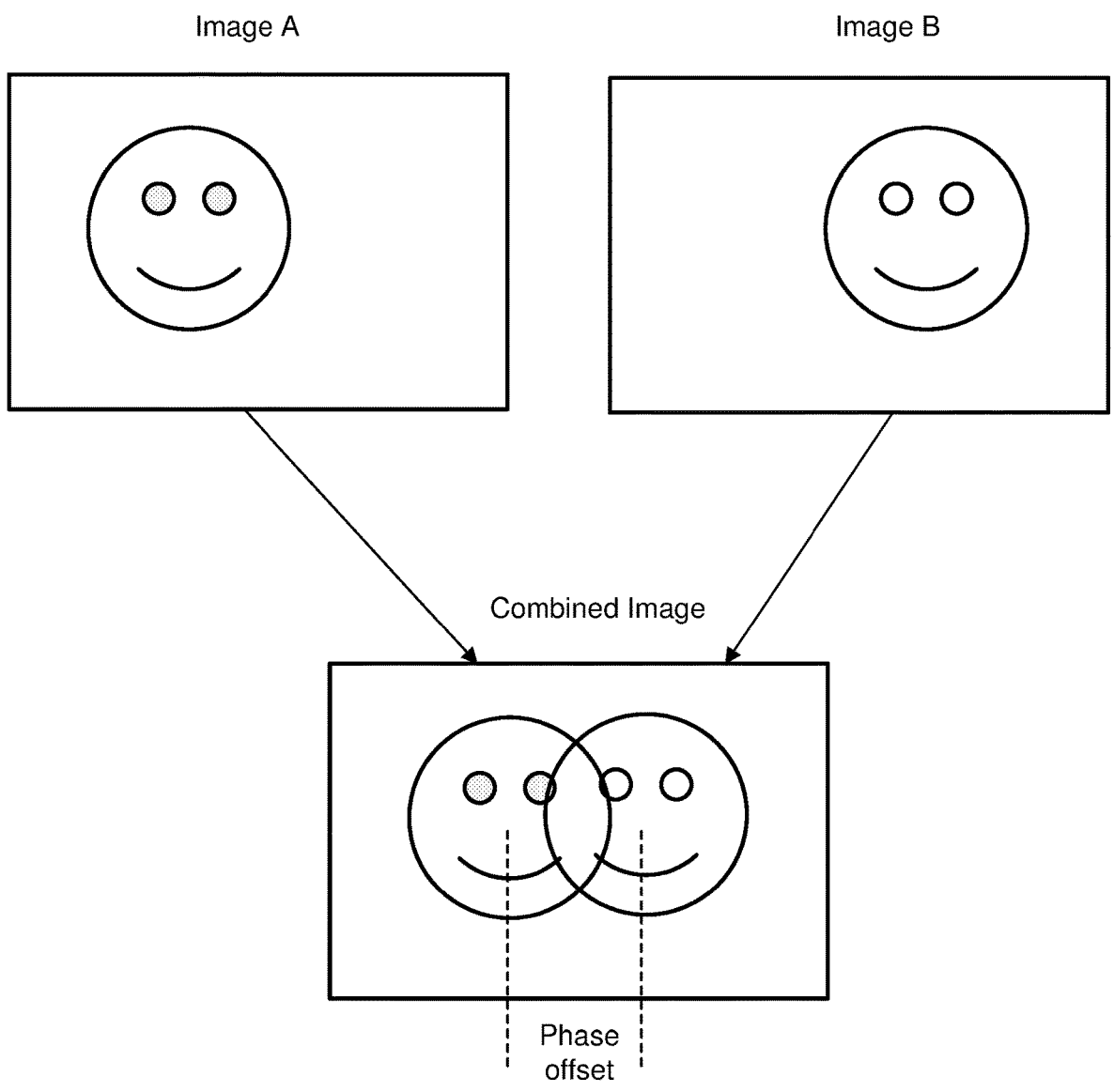
FIG. 10 is a schematic illustration of a scenario of imaging two spatially out-of-phase images.

Using a plurality of PD pixels distributed across the image sensor, such as illustrated in FIGS. 5, 7 and 8, allows two separate images of the object to be generated—a first image detecting the rays passing through an upper region of the imaging lens and a second image using the rays passing through a lower region of the imaging lens. When the object being imaged is in focus, the two images should spatially align and be spatially "in-phase". Conversely, when the object is out of focus, the two images will have a spatial phase difference which is proportional to the distance that the focal plane of lens 502 is offset from the imaging plane. This scenario of spatially out-of-phase images is illustrated in FIG. 10.

This spatial phase relationship between two images can be used in an autofocus routine to vary the position of lens 902 to bring the image into focus. In this regard, the phase shift between the two captured images maintains information about both:

the distance between the sensor and the image plane, and the direction towards the sensor should be moved.

However, the inventors have identified that the relationship can also be used to estimate the distance to an object being imaged.

Method of Measuring a Distance from a Camera to a Face of a Vehicle Driver

Referring now to FIG. 11, the above described system 100 can be used in conjunction with a camera having a sensor with PD pixels to perform a method (1100) of measuring a distance from a camera to a face of a vehicle driver. The method is described in the context of a driver monitoring system and, as such, the object being imaged is a driver's face. However, a person skilled in the art will realize that the method can be simply extended to estimating the distance to other objects in other scenes without modifying the method stages other than replacing the object being imaged.

Method 1100 includes, at stage 1101, positioning camera 106 at an imaging position to capture an image of driver 102 including the driver's face. In a typical driver monitoring system such as system 100 described above, the camera is pre-installed in the vehicle and positioned to image the driver's face when seated in a driver seat of the vehicle. In operation, camera 106 will capture a video stream of images of driver 102 and method 1100 may be performed on each captured image or a subset of the images in the image stream.

In the case of monitoring other objects, stage 1101 involves positioning camera 106 to monitor the object of interest.

At stage 1102, the image is processed to identify a face region in the image. The face region represents a region 1200 of pixels corresponding to the driver's face 1202 or head, as illustrated in FIG. 12. The facial region 1200 may be identified by a number of image processing techniques, including:

Performing edge or contrast detection to detect an outline of the driver's face and defining a region encompassing the outline of the face.

Performing facial recognition of the driver and defining a region centered on the recognized face or a feature of the recognized face.

Performing shape or pattern recognition by searching the image for one or more predefined face templates or facial feature templates.

Although region 1200 is illustrated as being rectangular in FIG. 12, region 1200 may represent any two dimensional shape which encompasses the detected face of driver 102. If the resolution is sufficient, region 1200 may represent only a sub region of the driver's face such as the driver's eyes, nose or mouth.

In the case of monitoring objects other than a driver's face, stage 1102 involved determining an object region by performing object detection, edge detection, pattern matching or other similar techniques to identify the object in the image.

At stage 1103, a subset of the PD pixels, representing those PD pixels located within region 1200, are determined, as illustrated in the lower panel of FIG. 12. In FIG. 12, only 12 dual pixel type PD pixels are illustrated in region 1200, which provides 12 image points for comparison. In practice, typically a much larger number of PD pixels would be included in region 1200. In the case where every pixel on the image sensor is a PD pixel, every pixel within region 1200 is a relevant pixel. Each PD pixel or pixel pair captures first and second image data corresponding to the light received on those pixels through the camera imaging system. The first and second images represent images of the same scene within the camera's field of view but are formed from light received along one of two (e.g. upper or lower) optical paths through the camera's imaging system.

At stage 1104, the first and second image data obtained by the first subset of the PD pixels are compared to determine a spatial image offset. This comparison process involves first identifying one of more features of the imaged scene (e.g. a driver's face) in both the first and second image data, and then determining a spatial offset between the features in both data sets. The spatial image offset is determined as a linear distance between corresponding images detected by the PD pixels or PD pixel pairs.

Figure 13:
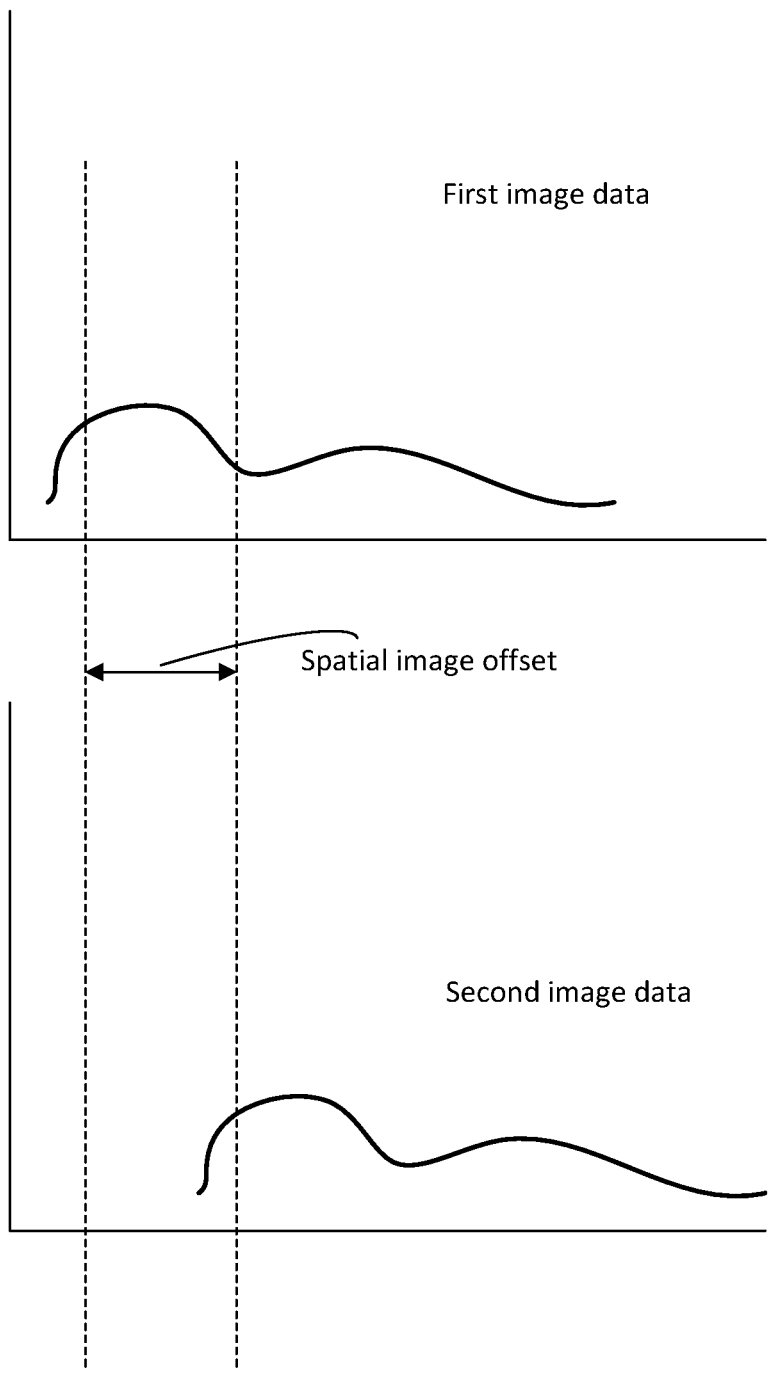
FIG. 13 is a comparison of intensity distribution profiles of first and second image data captured by phase detecting pixels.

As the first and second image data represent images of the same scene, it is relatively easy to identify corresponding points in the two datasets to determine an image offset. By way of example, the images in FIG. 10 can be easily compared by determining an offset between the pixel positions of corresponding eyes in both Image A and Image B. This same procedure can be performed on any scene being imaged provided features within that scene can be distinguished. This spatial image offset represents the phase offset illustrated in FIG. 10.

Where only a small number of PD pixels fall within region 1200, distinct image features may be difficult to distinguish. In this case, the overall intensity distribution of the first and second image data may be compared to determine the spatial image offset. An example one dimensional intensity distribution is illustrated schematically in FIG. 13, showing a clear definable spatial offset across the two image data. In a two dimensional image, the intensity distribution may be compared in two dimensions.

Next, at stage 1105, the determined spatial image offset is used to determine a first distance estimate of the distance between a region of the driver's face and the image sensor. Where region 1200 includes the driver's entire face, this distance estimate may be an average distance from the image sensor and the driver's face. Where region 1200 includes only a portion of the driver's face, such as an eye of the driver, the distance may be an estimate of the distance between the image sensor and that portion of the face. This latter technique is useful for accurately identifying the position of the driver's facial features in three dimensions for subsequent use in calculating head pose and eye gaze.

Figure 14:
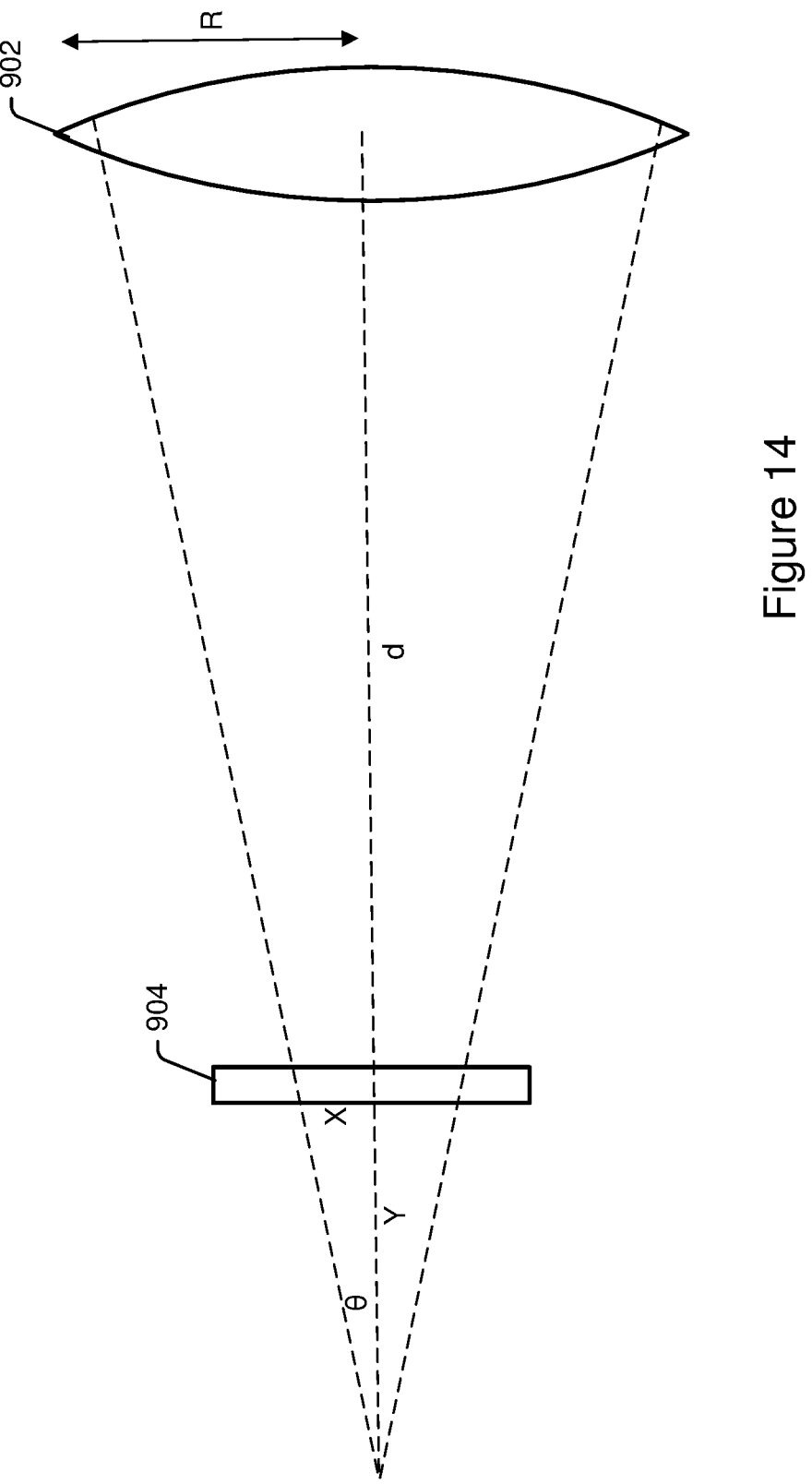
FIG. 14 is a schematic illustration of the system geometry for calculating a distance to an object using a spatial phase offset.

Step 1105 requires knowledge of the parameters of the camera's optical imaging system. With knowledge of the focal length (f) and radius (r) of the primary imaging lens, the following lens equation can be used to calculate object distance ($o_d$):

$$\frac{1}{o_d} + \frac{1}{i_d} = \frac{1}{f} \tag{1}$$

where $i_d$ represents the image distance of the image onto an image plane. The geometry of the system is illustrated schematically in FIG. 14. Here, the dimensions Y and d sum to give the image distance $i_d$. That is:

$$i_d = Y + d. \tag{2}$$

Also:

$$\tan\theta = \frac{R - X}{d} = \frac{R}{Y + d}. \tag{3}$$

Rearranging this equation gives:

$$Y + d = \frac{Rd}{R - X}. \tag{4}$$

Substituting equation (2) into equation (4) yields:

$$i_d = \frac{Rd}{R - X}. \tag{5}$$

Substituting this back into equation (1) provides:

$$\frac{1}{o_d} + \frac{R - X}{Rd} = \frac{1}{f}. \tag{6}$$

Rearranging this for the object distance gives:

$$o_d = f - \frac{Rd}{R - X}. \tag{7}$$

f, R and d are known system parameters and X is obtained from the spatial image offset calculated in stage 1104. Thus, the object distance can be calculated. The object distance described above represents only the distance between lens 902 and the object. The total object distance ($T_o$) between the driver's face and the image sensor 904, as illustrated in FIG. 9, is the sum of the object distance and the distance d and can be expressed as:

$$T_o = o_d + d \tag{8}.$$

Thus, from equation (8), the distance between a region of the driver's face and the image sensor can be estimated to extract depth information from the captured images.

Method 1100 can be performed prior to or during operation of a driver monitoring system, such as system 100. The estimated distance can be input to a driver monitoring algorithm for tracking the driver's head (head pose) or eyes (eye gaze). For example, the distance estimate, together with two dimensional facial feature locations within the image, can be input to fit the image of the driver's face to a three dimensional head model in a similar manner to that described in U.S. Pat. No. 7,043,056.

The distance estimated by method 1100 is a true measurement of range to the driver's face. This may be used repeatedly by driver monitoring algorithms or initially to calibrate the algorithms. In the latter scenario, method 1100 may be performed initially upon detection of a new or unknown driver of the vehicle. The distance estimate output from method 1100 is compared to a second distance estimate obtained by determining a size of the driver's face, head or eyes relative to average human standards using a size/distance model. This comparison allows a calibration of the face/head/eye size and thus a calibration of the second distance estimate which can be subsequently used in the driver monitoring algorithms with less error. The comparison can also be used to estimate a distance error measurement of the simple size/distance model.

Figure 15:
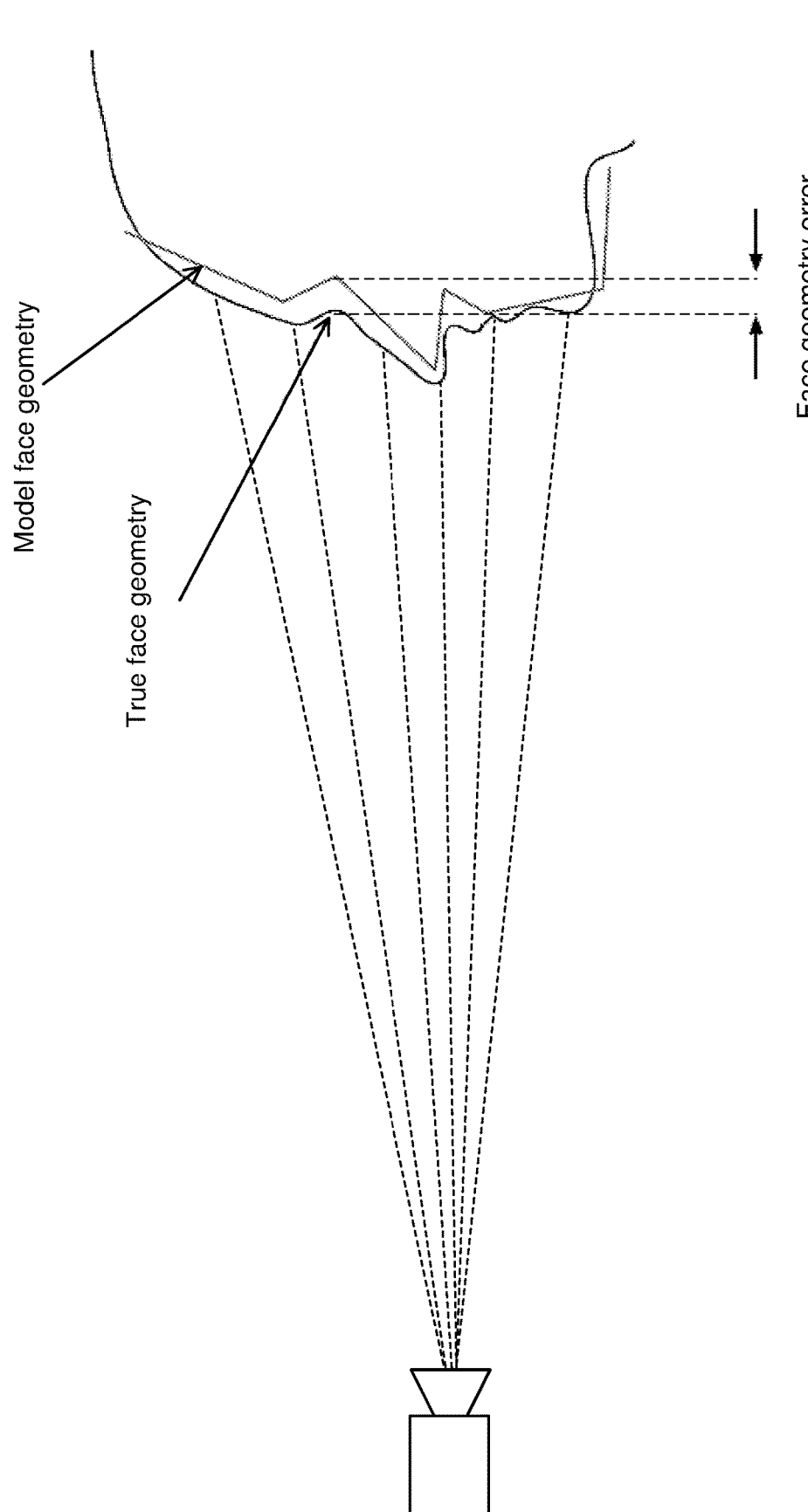
FIG. 15 is a schematic side view of a face portion of a head model overlaid on a driver's face and illustrating the range error due to differences in face geometry.

The distance measurement obtained in stage 1105 can be performed at each PD pixel that images a point of the driver's face. Thus, with a suitable density of PD pixels, multiple measurements of distance to the driver's face can be performed. Each distance measurement that falls in the area of the face is able to contribute to the body of data that calibrates the relationship between face scale and range. In this regard, the distance measurements are used to adjust the overall scale of a three dimensional head model for the individual driver. This is illustrated schematically in FIG. 15. The head scale used to compute a 3D head pose is adjusted to minimize the depth error along each PD ray. The 3D error between model geometry and true geometry is directly reflected in the resulting range error.

Even a single distance measurement from a single PD is useful in adjusting the head model to reduce distance/scale error. However, the greater the number of distance measurements, the more accurately the image of the driver's face can be fit to the head model. This approach need not be performed repeatedly for a given driver but is more accurate and robust if the scale correction is refined over time with a statistical approach.

Using the method described above, the impact of face geometry on head range is anticipated to be less than 5 mm.

CONCLUSIONS

It will be appreciated that the embodiments described above provide a range of advantages through the utilization of measurements from PD pixels to estimate distance in the driver face tracking algorithm. This disclosure provides for a video-based driver monitoring system that has (i) a significantly improved ability to measure the range to a driver's head and eyes from a single camera viewpoint, as well as (ii) being able to operate with reduced infrared illumination and (iii) with a larger range of eye positions from the camera.

This disclosure also provides for obtaining a true measurement of range, which avoids the range uncertainty error arising when assuming a specific head size for the driver.

INTERPRETATION

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Reference throughout this specification to "one embodiment", "some embodiments" or "an embodiment" means that a specific feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, various features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, included of or which includes is an open term that means including at least the elements/features that follow, but not excluding others. Thus, the term comprising, when recited in the claims, should not be interpreted as being limitative to the recited elements or stages listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with comprising.

It should be appreciated that in the above description of exemplary embodiments of the disclosure, various features of the disclosure are sometimes grouped together in a single embodiment, Figure, or description thereof for the purpose of streamlining the disclosure and aiding in the understanding of one or more of the various embodiments. This method of disclosure, however, is not to be interpreted as reflecting an intention that the claims require more features than are expressly recited in each claim. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

In addition to the disclosed embodiments, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. A method of measuring a distance from a single two-dimensional camera, having an imaging system, to a face of a subject in a vehicle in a subject monitoring system, the camera including a digital image sensor having pixels including a plurality of phase detecting pixels, the phase detecting pixels configured to distinguish light incident from different angles to determine spatial phase information and generate first and second image data corresponding to light received along two optical paths through the camera's imaging system, the method comprising:

a) receiving, from the camera, an image of the subject including the subject's face;

b) processing the image to identify a face region of the image as being a portion of the image that was generated by a region of pixels corresponding to the subject's face or head;

c) determining, within the region of pixels, a first subset of the phase detecting pixels as those phase detecting pixels which correspond to the face region;

d) comparing first and second image data generated by the first subset of the phase detecting pixels to determine a spatial image offset within the image;

e) determining, from the spatial image offset, a first distance estimate of a distance between a region of the subject's face and the digital image sensor;

f) providing the first distance estimate as input to a subject monitoring algorithm that determines tracking information including two-dimensional facial feature locations within the image; and g) providing the first distance estimate, and the two-dimensional facial feature locations, as input to a three-dimensional computational head model that determines a three-dimensional location of the subject's head.

2. The method according to claim 1, wherein determining the first distance estimate further comprises determining an estimate of a distance between one or more facial features of the subject's face and the digital image sensor.

3. The method according to claim 1 wherein step b) further comprises performing contrast detection to detect an outline of the subject's face.

4. The method according to claim 1 wherein step b) further comprises performing facial recognition of the subject.

5. The method according to claim 1 wherein step b) further comprises performing a face localization procedure by searching the image for features corresponding to features represented in one or more predefined face templates.

6. The method according to claim 1, further comprising determining a second distance estimate of a distance between the subject's face and the digital image sensor by determining a size of the face in the image and providing the determined size of the face as input to a computational size/distance model that determines the second distance estimate based on the determined size of the face.

7. The method according to claim 6, further comprising comparing the first distance estimate to the second distance estimate to determine a distance error measurement.

8. A method of remotely monitoring a head pose or eye gaze of a subject of a vehicle using a single camera, the method comprising:

a) receiving, from the camera, a plurality of time-sequenced images of the subject's face;

b) determining a two dimensional position of the subject's eyes in each of the images;

c) determining, for at least some of the images, a spatial image offset by comparing first and second image data generated by a plurality of phase detecting pixels in the digital image sensor;

d) determining a distance between the subject's face and a digital image sensor of the camera based on the spatial image offset;

e) determining for at least some of the images, based on steps b), c) and d), a three-dimensional position of the subject's face or eyes; and f) determining a head orientation or eye gaze of the subject based on the three-dimensional position of the subject's face or eyes.

9. A system configured to measure a distance of a face of a vehicle subject in a subject monitoring system, the system comprising:

a single camera, having an imaging system, positioned to capture an image of the subject including the subject's face, the camera including a digital image sensor having pixels including a plurality of phase detecting pixels, the phase detecting pixels configured to generate first and second image data corresponding to light received along two optical paths through the camera's imaging system; and a processor circuit configured to perform operations comprising:

controlling the camera to capture an image of the subject including the subject's face;

processing the image to identify a face region of the image as being a portion of the image that was generated by a region of pixels corresponding to the subject's face or head;

determining, within the region of pixels, a first subset of the phase detecting pixels as those phase detecting pixels which correspond to the face region;

comparing first and second image data generated by the first subset of the phase detecting pixels to determine a spatial image offset; and determining, from the spatial image offset, a first distance estimate of a distance between a region of the subject's face and the digital image sensor.

\* \* \* \* \*